Figure 1:
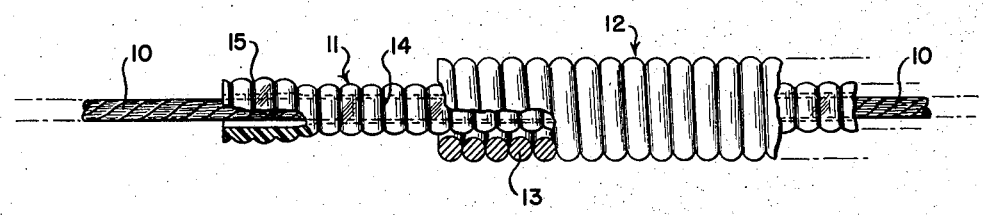

Sept. 9, 1958    O. J. BRATZ    2,850,915

PUSH-PULL CABLE

Filed March 15, 1957

INVENTOR
Otto J. Bratz
BY
ATTORNEYS

United States Patent Office 2,850,915
Patented Sept. 9, 1958

2,850,915
PUSH-PULL CABLE

Otto J. Bratz, Adrian, Mich., assignor to American Chain & Cable Company, Inc., a corporation of New York Application March 15, 1957, Serial No. 646,298

9 Claims. (Cl. 74—501)

This invention relates to push-pull cable assemblies, and has for its principal object to provide such an assembly which is simple to manufacture, durable in use, and virtually silent in operation.

Push-pull cables are devices used to transmit translational motion for a substantial distance and generally around bends. Basically they comprise a tubular casing which in use is anchored securely at its two ends, and a flexible core member which is free to be moved axially through the casing. A common type of push-pull cable comprises a casing made by winding one or more wires helically into a closed coil, and inserting axially through such coil a metallic wire, or, where ease of operation warrants it, a stranded metallic cable. Such cable assemblies are eminently satisfactory for use wherever the force required to be transmitted is of modest magnitude, in the range from a few pounds to a few tens of pounds.

One type of apparatus in which push-pull cables of this nature are used is prosthetic devices. Ordinarily push-pull cables of all-metallic construction do not fully meet the requirements of this use, however. A major requirement of prosthetic devices is that they operate silently at all times, and another important requirement is that they operate with complete reliability in transmitting a full normal load with frequent repetition over a prolonged period of time. Push-pull cables of all-metallic construction, as heretofore generally used in prosthetic devices, are reasonably quiet in operation, especially when new. Even when new, however, they are not completely silent, and as they become more and more used they generally become more and more audible in operation. Furthermore, push-pull cables of all-metallic construction are subject to rather rapid wear, which results in increased difficulty of operation, often culminating in complete or essentially complete inoperability. Wear also leads to increased, often very objectionable, audibility of operation. By maintaining an ample coating of lubricant within the casing, both the quietness of operation and the wear resistance of these push-pull cables can be substantially increased. The nature of prosthetic devices, however, often makes it necessary that the push-pull cables used in them be completely free from any lubricant of a fluid or semi-solid (greasy) character, or of any other character that can soil clothing, the skin, etc. For all practical purposes this requirement can only be met by leaving the cable unlubricated—the very condition under which it becomes noisy most rapidly, and is most subject to rapid wear.

The present invention provides an improved push-pull cable assembly which is of simple construction and is characterized by an ability to operate with substantially complete silence and reliability, without lubrication, almost indefinitely. The new cable comprises a flexible metallic core element axially movable within a casing which comprises a tube of resinous plastic material disposed within a metallic sheath. While various resinous plastic compositions are available for use in making the tube, it is preferably made of nylon, or in some cases of polytetra-fluoroethylene. The sheath is made by helically winding at least one metallic wire into a closed coil. The plastic tube is of smaller outside diameter than the inside diameter of the sheath, and its outer surface is grooved peripherally, the distance from groove to groove along the length of the tube being approximately the same as the diameter of the wire of the sheath coil. Advantageously one end portion of the grooved tube is expanded sufficiently to be screw-threaded into an end of the sheath coil and thus to be restrained from longitudinal movement relative to the sheath. When one end portion of the tube is thus expanded, only the expanded portion need be formed with the helical groove. Preferably, however, the entire length of the plastic tube is formed with such groove. Then, when the assembly is bent and a tensile or compressive (pull or push) force is exerted on the core element, the plastic tube is urged against the sheath so that the sheath coil engages in the groove in the tube and restrains it from longitudinal movement relative to the sheath.

Figure 2:
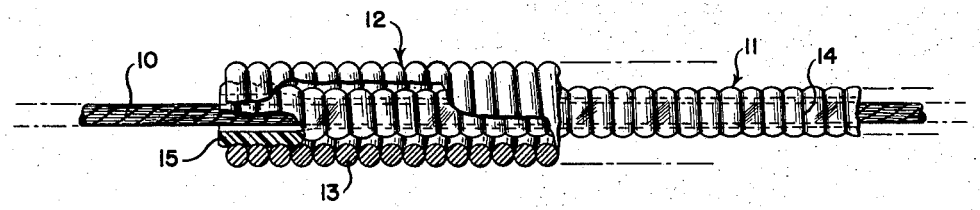
Figure 3:
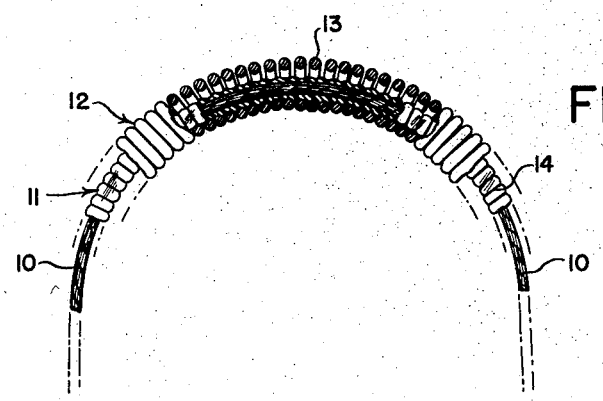

The foregoing and other features of the invention are described below with reference to the accompanying drawings, in which Fig. 1 is an elevation, partially in section, showing a preferred embodiment of the new push-pull cable with the plastic tube slightly withdrawn from the metallic sheath coil;

Fig. 2 is a view similar to Fig. 1, but showing the plastic tube screw-threaded into the end of the sheath coil; and Fig. 3 is a view on a reduced scale of the cable bent through a considerable angle and with the core element under tension.

The cable shown in the drawings comprises a core element 10, which preferably is a cable stranded from a large number of fine wires to make it easily flexible. For use in prosthetic devices, the core element is preferably a stranded stainless steel cable. It extends through a casing comprising a tube 11 of resinous plastic material inserted in a flexible metallic sheath 12.

The plastic tube 11 is preferably an extruded seamless tube of moderate wall thickness, and of inside diameter only enough greater than the outside diameter of the core element to permit the latter to slide back and forth therein easily. The sheath coil 12 is preferably a single steel wire 13 (or, if desired two or more wires) wound helically into a closed coil of inside diameter only slightly greater than the outside diameter of the plastic tubing. For use in prosthetic devices, the sheath coil is advantageously made of stainless steel or other corrosion resistant metal.

The outside surface of the plastic tube is formed with a helical groove 14 having approximately the same pitch as the helical sheath coil. Such groove can be formed, for example, by supporting the tube against collapse by inserting a mandrel into it, and then passing it through a thread rolling head, whereby the helical groove is embossed in it. If the sheath is formed of two wires coiled side by side, then a corresponding double thread groove is preferably formed in the plastic tube. When the groove is formed by an embossing or similar operation, it may be necessary, depending on the particular plastic material used, to subject the embossed plastic to some form of heat treatment to insure that the embossed groove does not gradually disappear due to the form-recovery properties of the plastic material. In lieu of embossing the helical groove, it can be formed by a cutting (machining) operation, or the tube can be formed by molding and in such case the groove can be molded in its outer surface.

As the tube 11 is of smaller outside diameter than the inside diameter of the sheath coil, the tube can be easily inserted into the sheath. To hold it therein and prevent it from accidentally slipping out, one end portion 15 of the tube is preferably expanded to a maximum outside diameter slightly greater than the inside diameter of the sheath coil. It is then possible to screw-thread the expanded end portion of the plastic tube into the end of the sheath coil, thus securing it in place therein. It is important during use of the cable that the plastic tube remain in fixed position within the sheath 12, because for silence and ease of operation only the core element should move relative to the plastic tube, and not the plastic tube relative to the sheath. The screw-thread engagement between the expanded end portion of the plastic tube and the end portion of the sheath coil will suffice in some cases to hold these two casing components fixed in relation to each other. In such cases only the expanded portion of the plastic tube need be grooved. However, it is preferable that the tube be grooved throughout its entire length. Then, when the cable assembly is bent and a tensile force is applied to the core element, the outside surface of the tube is pressed tightly against the inside of the sheath, as shown in Fig. 3. The coil of the sheath then engages in the grooves of the tube and restrains it from axial motion with respect to the sheath coil. The same result is occasioned by applying a compressive force to the core element, except that in such case the tube is urged to the outside of the curve of the casing rather than to the inside. It is of course preferable for this purpose that the groove in the tube be helical and of substantially the same pitch and direction as the sheath coil. Good restraint against movement of the tube relative to the sheath is attained, however, even when the pitch of the groove is rather different from that of the sheath coil; and it is even possible for the grooves to be of opposite pitch direction to the sheath coil, or truly circumferential instead of helical, and still be effective to restrain the tube from sliding within the sheath coil.

Although a considerable number of different resinous plastic materials are available for making the plastic tube 11, nylon (superpolyamide resin) is outstanding. It is quite hard yet adequately flexible, and its coefficient of friction against the core element is very low. Hence the use of a nylon tube in a cable of the construction described results in virtually complete silence in operation and extremely long life, even in the absence of any lubrication. Polytetrafluoroethylene is another resinous plastic material which is a very satisfactory material for the tube 11, but it is less preferred than nylon because it is somewhat softer and notably more costly. Its frictional properties are such, however, that for some uses it may be preferred to nylon despite the other drawbacks to its use.

Other available resinous plastic materials are distinctly inferior to nylon and polytetrafluoroethylene. Polyethylene, for example, while it possesses very good friction properties, is considerably softer than nylon and for this reason does not give nearly as long service life. It may, however, be used in cables subjected to very light loads. Irradiated polyethylene (polyethylene that has been exposed to intense ionizing radiations, such as in a nuclear reactor) is harder than ordinary polyethylene, and accordingly is more satisfactory. Vinyl polymers, such as vinyl idene chloride polymer, vinyl chloride plus vinyl idene chloride copolymer, and polyvinyl chloride, all have relatively poor friction characteristics and rather poor wear qualities, and for these reasons are not generally preferred. Cellulose acetate butyrate and other cellulosic plastic compositions have substantially better friction properties and give longer life than the vinyl plastics, but are not so good as nylon or polytetrafluoroethylene. They are relatively cheap, however, and can be used in cables when low manufacturing cost is of importance. Methacrylate plastic compositions such as methyl methacrylate polymer are rather stiff and brittle, and hence are not well suited for use in cables where flexibility is an important criterion.

Because of the marked superiority of nylon over all other resinous plastic materials, it is to be expected that this material will in general be used for making cables according to this invention. As indicated, however, there are situations in which some other plastic material may be selected; and accordingly the invention is not limited to the use of nylon as the plastic tube material.

Cables according to this invention are eminently suited for use wherever a push-pull cable capable of transmitting a low to moderate force is required. In addition to being exceptionally silent in operation and capable of operation (especially when nylon or polytetrafluoroethylene is the material of the plastic tube), without lubrication, the plastic tube completely seals out dust, moisture and other foreign substances which, if present, can lead to early failure on account of abrasive or corrosive effect on the relatively moving parts.

I claim:

1. A casing for a push-pull cable comprising a tube of resinous plastic material disposed within a metallic sheath, said sheath comprising at least one wire helically wound into a closed coil, and said plastic tube being enough smaller in outside diameter than the inside diameter of the sheath to enable it to be inserted axially into the sheath, and having its outer surface peripherally grooved with the distance from groove to groove along the length of the tube being approximately the same as the diameter of the wire of the sheath coil, whereby when said casing is bent the sheath coil engages in said groove and restrains said tube against longitudinal movement relative to the sheath.

2. A casing for a push-pull cable comprising a nylon tube disposed within a metallic sheath, said sheath comprising at least one wire helically wound into a closed coil, and said nylon tube being enough smaller in outside diameter than the inside diameter of the sheath to enable it to be inserted axially into the sheath, and having its outer surface peripherally grooved with the distance from groove to groove along the length of the tube being approximately the same as the diameter of the wire of the sheath coil, whereby when said casing is bent the sheath coil engages in said groove and restrains said tube against longitudinal movement relative to the sheath.

3. A casing for a push-pull cable comprising a polytetrafluoroethylene tube disposed within a metallic sheath, said sheath comprising at least one wire helically wound into a closed coil, and said polytetrafluoroethylene tube being enough smaller in outside diameter than the inside diameter of the sheath to enable it to be inserted axially into the sheath, and having its outer surface peripherally grooved with the distance from groove to groove along the length of the tube being approximately the same as the diameter of the wire of the sheath coil, whereby when said casing is bent the sheath coil engages in said groove and restrains said tube against longitudinal movement relative to the sheath.

4. A casing for a push-pull cable comprising a tube of resinous plastic material disposed within a metallic sheath, said sheath comprising at least one wire helically wound into a closed coil of inside diameter greater than the outside diameter of said tube, said plastic tube having its outer surface formed at least along one end portion with a helical groove of approximately the same pitch as the sheath coil, and said grooved end of the plastic tube being expanded sufficiently to be screw-threaded into an end portion of the sheath coil and so restrained from longitudinal movement relative to the sheath.

5. A casing for a push-pull cable comprising a nylon tube disposed within a metallic sheath, said sheath comprising at least one wire helically wound into a closed coil of inside diameter greater than the outside diameter of said tube, said nylon tube having its outer surface formed throughout its length with a helical groove of approximately the same pitch as the sheath coil, and one end portion of the nylon tube being expanded sufficiently to be screw-threaded into an end of the sheath coil and so restrained from longitudinal movement relative to the sheath.

6. A push-pull cable assembly comprising a flexible metallic core element axially movable within a casing comprising a tube of resinous plastic material disposed within a metallic sheath, said sheath comprising at least one wire helically wound into a closed coil, and said tube being enough smaller in outside diameter than the inside diameter of the sheath to enable it to be inserted axially into the sheath, and having its outer surface formed with a helical groove of approximately the same pitch as the sheath coil, whereby when said casing is bent and a force is imposed on the core element the plastic tube is drawn against the casing coil and is restrained from axial movement relative thereto by engagement of the coil in the tube groove.

7. A push-pull cable assembly comprising a flexible metallic core element axially movable within a casing comprising a nylon tube disposed within a metallic sheath, said sheath comprising at least one wire helically wound into a closed coil, and said tube being enough smaller in outside diameter than the inside diameter of the sheath to enable it to be inserted axially into the sheath, and having its outer surface formed with a helical groove of approximately the same pitch as the sheath coil, whereby when said casing is bent and a force is imposed on the core element the nylon tube is drawn against the casing coil and is restrained from axial movement relative thereto by engagement of the coil in the tube groove.

8. A push-pull cable assembly comprising a flexible metallic core element axially movable within a casing, said casing comprising a tube of resinous plastic material disposed within a metallic sheath, said sheath comprising at least one metallic wire helically wound into a closed coil, and said plastic tube being of smaller outside diameter than the inside diameter of the sheath and having its outer surface formed with a helical groove of approximately the same pitch as the sheath coil, one end portion of said grooved tube being expanded sufficiently to be screw-threaded into an end portion of the sheath coil and to be restrained thereby from longitudinal movement relative to the sheath, said tube being further restrained from longitudinal movement relative to the sheath by engagement of the sheath coil in the groove of the tube whenever the assembly is bent and a force is applied to the core element.

9. A push-pull cable assembly comprising a flexible metallic core element axially movable within a casing, said casing comprising a nylon tube disposed within a metallic sheath, said sheath comprising at least one metallic wire helically wound into a closed coil, and said nylon tube being of smaller outside diameter than the inside diameter of the sheath and having its outer surface formed with a helical groove of approximately the same pitch as the sheath coil, one end portion of said grooved tube being expanded sufficiently to be screw-threaded into an end portion of the sheath coil and to be restrained thereby from longitudinal movement relative to the sheath, said tube being further restrained from longitudinal movement relative to the sheath by engagement of the sheath coil in the groove of the tube whenever the assembly is bent and a force is applied to the core element.

References Cited in the file of this patent

UNITED STATES PATENTS 1,723,986   Wallace _____ Aug. 6, 1929

FOREIGN PATENTS 520,585   Belgium _____ June 30, 1953

OTHER REFERENCES

Resistoflex Corp., page 80 (Design News), Jan. 15, 1956. (Copy in Division 12.)